United States Patent
Kim et al.

(10) Patent No.: US 10,686,215 B2
(45) Date of Patent: Jun. 16, 2020

(54) POSITIVE ELECTRODE FOR SECONDARY BATTERY, AND LITHIUM SECONDARY BATTERY INCLUDING SAME

(71) Applicant: LG Chem, Ltd., Seoul (KR)

(72) Inventors: Hye Bin Kim, Daejeon (KR); Jong Keon Yoon, Daejeon (KR); Song Taek Oh, Daejeon (KR); Jung Seok Choi, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/070,071

(22) PCT Filed: Nov. 20, 2017

(86) PCT No.: PCT/KR2017/013210
§ 371 (c)(1),
(2) Date: Jul. 13, 2018

(87) PCT Pub. No.: WO2018/097562
PCT Pub. Date: May 31, 2018

(65) Prior Publication Data
US 2019/0036154 A1    Jan. 31, 2019

(30) Foreign Application Priority Data
Nov. 23, 2016    (KR) .......................... 10-2016-0156826

(51) Int. Cl.
*H01M 10/0525*    (2010.01)
*H01M 4/131*    (2010.01)
(Continued)

(52) U.S. Cl.
CPC ....... *H01M 10/0525* (2013.01); *H01M 4/131* (2013.01); *H01M 4/366* (2013.01);
(Continued)

(58) Field of Classification Search
CPC .. H01M 10/0525; H01M 4/621; H01M 4/525; H01M 4/505; H01M 4/366;
(Continued)

(56) References Cited

U.S. PATENT DOCUMENTS

2012/0328942 A1*  12/2012  Thomas-Alyea ..... H01M 4/587
                                                          429/211
2013/0209865 A1    8/2013  Kim et al.
(Continued)

FOREIGN PATENT DOCUMENTS

JP    2002-063937 A    2/2002
JP    2008293875 A    12/2008
(Continued)

OTHER PUBLICATIONS

International Search Report From PCT/KR2017/013210 dated Mar. 5, 2018.
(Continued)

*Primary Examiner* — Gary D Harris
(74) *Attorney, Agent, or Firm* — Lerner, David, Littenberg, Krumholz & Mentlik, LLP

(57) ABSTRACT

Provided is a positive electrode for a secondary battery, the positive electrode including a positive electrode current collector, a first positive electrode mixture layer laminated on the positive electrode current collector and including a first positive electrode active material and a first conductive material, and a second positive electrode mixture layer laminated on the first positive electrode mixture layer and including a second positive electrode active material and a second conductive material, wherein the average particle diameter ($D_{50}$) of the second positive electrode active material is 5 to 80% of the average particle diameter ($D_{50}$) of the first positive electrode active material, and the ratio of the specific surface area of the second conductive material to the
(Continued)

specific surface area of the second positive electrode active material is 9 or less.

14 Claims, 1 Drawing Sheet

(51) Int. Cl.
    *H01M 4/62* (2006.01)
    *H01M 4/36* (2006.01)
    *H01M 4/505* (2010.01)
    *H01M 4/525* (2010.01)
    *H01M 4/02* (2006.01)

(52) U.S. Cl.
    CPC ........... *H01M 4/505* (2013.01); *H01M 4/525* (2013.01); *H01M 4/621* (2013.01); *H01M 4/625* (2013.01); *H01M 2004/021* (2013.01); *H01M 2004/028* (2013.01)

(58) Field of Classification Search
    CPC ................ H01M 4/131; H01M 4/625; H01M 2004/028; H01M 2004/021
    USPC ...................................................... 429/231.95
    See application file for complete search history.

(56) References Cited

U.S. PATENT DOCUMENTS

| 2014/0363736 A1 | 12/2014 | Kim et al. |
| 2016/0049645 A1* | 2/2016 | Zheng ................... H01M 4/366 429/220 |

FOREIGN PATENT DOCUMENTS

| JP | 2013211096 A | 10/2013 |
| JP | 2015-015183 A | 1/2015 |
| JP | 2015125832 A | 7/2015 |
| KR | 20120034060 A | 4/2012 |
| KR | 2014-0017470 A | 2/2014 |
| KR | 2014-0138079 A | 12/2014 |

OTHER PUBLICATIONS

Extended European Search Report including Written Opinion for Application No. EP17874852 dated Nov. 13, 2018.

* cited by examiner

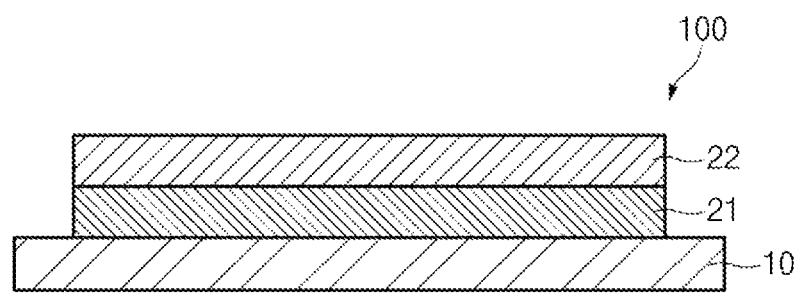

POSITIVE ELECTRODE FOR SECONDARY BATTERY, AND LITHIUM SECONDARY BATTERY INCLUDING SAME

CROSS-REFERENCE TO RELATED APPLICATIONS

The present application is a national phase entry under 35 U.S.C. § 371 of International Application No. PCT/KR2017/013210, filed on Nov. 20, 2017, which claims the benefit of Korean Patent Application No. 10-2016-0156826, filed on Nov. 23, 2016, the disclosures of which are incorporated herein by reference.

TECHNICAL FIELD

The present invention relates to a positive electrode for a secondary battery, and a lithium secondary battery including the same.

BACKGROUND ART

As the technology development and demand for mobile devices increase, the demand for secondary batteries as an energy source is rapidly increasing. Among such secondary batteries, lithium secondary batteries having high energy density and voltage, long cycle life, and low self-discharging rate have been commercialized and widely used.

As positive electrode active materials of lithium secondary batteries, lithium transition metal composite oxides have been used. Among these oxides, a lithium cobalt composite metal oxide of $LiCoO_2$ having a high operating voltage and excellent capacity properties has been mainly used. However, since $LiCoO_2$ has very poor thermal properties due to an unstable crystal structure caused by lithium deintercalation, and also is expensive, there is a limitation in using a large amount of $LiCoO_2$ as a power source for applications such as electric vehicles.

As materials for replacing $LiCoO_2$, a lithium manganese composite oxide ($LiMnO_2$ or $LiMn_2O_4$), a lithium iron phosphate compound ($LiFePO_4$, etc.), and a lithium nickel composite oxide ($LiNiO_2$, etc.) have been developed. The research and development of a lithium nickel composite oxide among these materials which has a high reversible capacity of about 200 mAh/g, thereby allowing for a bigger capacity battery to be easily implemented, has been more actively conducted. However, when compared with $LiCoO2$, $LiNiO2$ has limitations in that the thermal stability thereof is poor, and when an internal short circuit occurs in a charged state due to pressure from the outside and the like, a positive electrode active material itself is decomposed causing the rupture and ignition of the battery.

Accordingly, as a method for improving the low thermal stability while maintaining the excellent reversible capacity of $LiNiO_2$a, a method of substituting a portion of nickel (Ni) with cobalt (Co) or manganese (Mn) has been proposed. However, in the case of $LiNi_{1-\alpha}Co_\alpha O_2$ ($\alpha$=0.1~0.3) in which a portion of nickel is substituted with cobalt, there are limitations in that the excellent charge and discharge properties and lifespan properties were obtained, but the thermal stability was low. Also, in the cases of a nickel manganese-based lithium composite metal oxide in which a portion of Ni is substituted with Mn having excellent thermal stability, and a nickel manganese cobalt manganese-based lithium composite metal oxide (hereinafter, simply referred to as a "NMC-based lithium oxide") in which a portion of Ni is substituted with Mn and Co, the cycle properties and thermal stability are relatively excellent. However, due to the low resistance thereof, when a metal body such as a nail penetrates, an internal short circuit does not occur, causing serious problems in terms of safety such as ignition or explosion due to instantaneous overcurrent.

DISCLOSURE OF THE INVENTION

Technical Problem

An aspect of the present invention provides a positive electrode with improved stability for a secondary battery and a secondary battery including the same, the positive electrode having high capacity, high output performance, excellent cycle properties, and thermal stability, and being capable of suppressing overcurrent by increasing the resistance between an upper layer portion of an electrode and a metal body when the metal body such as a nail penetrates the electrode from the outside, thereby preventing the ignition or explosion of a battery due to the overcurrent.

Technical Solution

According to an aspect of the present invention, there is provided a positive electrode for a secondary battery, the positive electrode including a positive electrode current collector, a first positive electrode mixture layer laminated on the positive electrode current collector and including a first positive electrode active material and a first conductive material, and a second positive electrode mixture layer laminated on the first positive electrode mixture layer and including a second positive electrode active material and a second conductive material. The average particle diameter ($D_{50}$) of the second positive electrode active material is 5 to 80% of the average particle diameter ($D_{50}$) of the first positive electrode active material, and the ratio of the specific surface area of the second conductive material to the specific surface area of the second positive electrode active material is 9 or less.

According to another aspect of the present invention, there is provided a lithium secondary battery including the positive electrode.

Advantageous Effects

A positive electrode for a secondary battery according to an embodiment of the present invention has high capacity, high output performance, excellent cycle properties, and thermal stability, and is capable of suppressing overcurrent by increasing the resistance between an upper layer portion of an electrode and a metal body when the metal body such as a nail penetrates the electrode from the outside, thereby preventing the ignition or explosion of a battery due to the overcurrent.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

The FIGURE is a schematic cross-sectional view of a positive electrode for a secondary battery according to an embodiment of the present invention.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The accompanying drawings are for the purpose of clearly illustrating the present invention and are not intended to limit the present invention to the embodiments shown in the drawings. The shape and size of the elements in the drawings may be exaggerated for clarity, and parts that are not related to the description are omitted, and the same reference numerals are used for the same components in the same reference numerals.

The FIGURE is a schematic cross-sectional view of a positive electrode for a secondary battery according to an embodiment of the present invention.

Referring to the FIGURE, a positive electrode for a secondary battery 100 according to an embodiment of the present invention includes a positive electrode current collector 10, a first positive electrode mixture layer 21 laminated on the positive electrode current collector 10, and a second positive electrode mixture layer 22 laminated on the first positive electrode mixture layer 21. The first positive electrode mixture layer 21 includes a first positive electrode active material and a first conductive material, and the second positive electrode mixture layer 22 includes a second positive electrode active material and a second conductive material.

The first and the second positive electrode mixture layers 21 and 22 may be prepared by applying a slurry in which a positive electrode active material, a conductive material, and a binder are mixed, and then drying and rolling the same. If necessary, an additive such as a filler may further be included in the slurry.

The first positive electrode active material and/or the second positive electrode active material may include a lithium transition metal oxide represented by Formula 1 below.

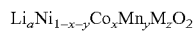

$$Li_aNi_{1-x-y}Co_xMn_yM_zO_2 \quad [\text{Formula 1}]$$

(in the above formula, M is any one or more elements selected from the group consisting of Al, Zr, Ti, Mg, Ta, Nb, Mo and Cr, and $0.9 \leq a \leq 1.5$, $0 \leq x \leq 0.5$, $0 \leq y \leq 0.5$, $0 \leq z \leq 0.1$, and $0 \leq x+y \leq 0.7$)

However, the first positive electrode active material and/or the second positive electrode active material are not necessarily limited to the lithium transition metal oxide represented by Formula 1. The first positive electrode active material and/or the second positive electrode active material may include a layered compound such as lithium cobalt oxide ($LiCoO_2$) and lithium nickel oxide ($LiNiO_2$), or a compound substituted with one or more transition metals; a lithium manganese oxide such as the formula $Li_{1+x1}Mn_{2-x1}O_4$ (wherein, x1 is 0 to 0.33), $LiMnO_3$, $LiMn_2O_3$, and $LiMnO_2$; lithium copper oxide ($Li_2CuO_2$); a vanadium oxide such as $LiV_3O_8$, $LiV_3O_4$, $V_2O_3$, and $Cu_2V_2O_7$; an Ni-site type lithium nickel oxide represented by the formula $LiNi_{1-x2}M^1_{x2}O_2$ (wherein, $M^1$=Co, Mn, Al, Cu, Fe, Mg, B or Ga, and x2=0.01 to 0.3); a lithium manganese complex oxide represented by the formula $LiMn_{2-x3}M^2_{x3}O_2$ (wherein, $M^2$=Co, Ni, Fe, Cr, Zn or Ta, and x3=0.01 to 0.1), or $Li_2Mn_3M^3O_8$ (wherein, $M^3$=Fe, Co, Ni, Cu or Zn); a lithium manganese complex oxide having a spinel structure and represented by $Li_{x4}Mn_{2-x4}O_4$ (wherein, x4=0.01 to 1); $LiMn_2O_4$ of which a part of Li in the formula is substituted with an alkaline earth metal ion; a disulfide compound; $Fe_2(MoO_4)_3$, and the like.

Meanwhile, the first and the second positive electrode active materials may include lithium transition metal oxides having the same composition, or may include lithium transition metal oxides having different compositions.

An average particle diameter ($D_{50}$) of the first positive electrode active material of the present invention is larger than an average particle diameter ($D_{50}$) of the second positive electrode active material. Specifically, the average particle diameter ($D_{50}$) of the second positive electrode active material satisfies 5 to 80% of the average particle diameter ($D_{50}$) of the first positive electrode active material.

In the present invention, an average particle diameter ($D_{50}$) may be defined as a particle diameter corresponding to 50% of the volume accumulation in a particle diameter distribution curve. The average particle diameter ($D_{50}$), for example, may be measured by using a laser diffraction method. For example, a method for measuring the average particle diameter ($D_{50}$) of the positive electrode active material may be performed by dispersing particles of the positive electrode active material in a dispersion medium, introducing the dispersed particles to a commercially available laser diffraction particle size measurement device (for example, Microtrac MT 3000) to irradiate the same with an ultrasonic wave of about 28 kHz to an output of 60 W, and measuring the average particle diameter ($D_{50}$) corresponding to 50% of the volume accumulation in the measurement device.

That is, in the first positive electrode mixture layer 21 adjacent to the positive electrode current collector 10, a first positive electrode active material having a relatively large particle diameter is included, and in the second positive electrode mixture layer 22 disposed in an upper layer portion of the electrode, a second positive electrode active material having a relatively small particle diameter is included.

Accordingly, the specific surface area of the first positive electrode active material included in the first positive electrode mixture layer 21 is relatively small, and the specific surface area of the second electrode active material included in the second positive electrode mixture layer 22 is relatively large. When the first and the second positive electrode mixture layers 21 and 22 include the same amount of conductive material, the first positive electrode mixture layer 21 shows relatively high electrical conductivity, and the second positive electrode mixture layer shows relatively low electrical conductivity. If the electrical conductivity of the second positive electrode mixture layer 22 which is an upper layer portion of the electrode is low, when a metal body penetrates the electrode from the outside, the resistance between the positive electrode and the metal body is increased.

However, there is a limitation in increasing the resistance between a positive electrode and a metal body when the metal body penetrates the electrode from the outside simply by forming a multilayered structure having different particle diameters of positive electrode active materials. Thus, there has been a demand for improving stability.

Therefore, according to the present invention, in the first and the second positive electrode mixture layers 21 and having different particle diameters ($D_{50}$) of positive electrode active materials, the ratio of the specific surface area of a conductive material to the specific surface area of a positive electrode active material is controlled such that the resistance between a positive electrode and a metal body is significantly increased when the metal body penetrates the electrode. Accordingly, overcurrent is suppressed and the ignition or explosion of an electrode due to the overcurrent is prevented, thereby improving stability.

Specifically, the second positive electrode mixture layer 22 disposed in an upper layer portion of the electrode may allow the ratio of the specific surface area of the second conductive material to the specific surface area of the second positive electrode active material to be 9 or less.

As such, by allowing the ratio of the specific surface area of the second conductive material to the specific surface area of the second positive electrode active material to be 9 or less, the electrical conductivity of the second positive electrode mixture layer 22 may further be reduced. Accordingly, when a metal body penetrates from the outside, the resistance between the second positive electrode mixture layer 22 and the metal body is greatly increased, thereby affecting the voltage drop during the initial stage of penetration, and as a result, the stability may be significantly improved.

In addition, the first positive electrode mixture layer 21 adjacent to the positive electrode current collector 10 may allow the ratio of the specific surface area of the first conductive material to the specific surface area of the first positive electrode active material to be 11 or greater.

As such, by allowing the ratio of the specific surface area of the first conductive material to the specific surface area of the first positive electrode active material to be 11 or greater, the electrical conductivity of the first positive electrode mixture layer 21 may further be increased.

Accordingly, the electrical conductivity of the entire positive electrode may be maintained at a predetermined level, and when a metal body penetrates from the outside, the resistance between the positive electrode and the metal body may be increased.

That is, according to an embodiment of the present invention, in the first and the second positive electrode mixture layers 21 and 22 having different particle diameters ($D_{50}$) of positive electrode active materials, the ratio of the specific surface area of a conductive material to the specific surface area of a positive electrode active material is controlled such that the electrical conductivity of the second positive electrode mixture layer 22 disposed in an upper layer portion of the electrode thereby being initially penetrated is further reduced, and the electrical conductivity of the first positive electrode mixture layer 21 disposed in a lower layer portion of the electrode is increased. Accordingly, the electrical conductivity of the entire positive electrode is maintained at a predetermined level, and when a metal body penetrates from the outside, the resistance between the positive electrode and the metal body is significantly increased without deteriorating the output properties.

The average particle diameter ($D_{50}$) of the first positive electrode active material may be 10 to 100 μm, and the average particle diameter ($D_{50}$) of the second positive electrode active material may be 1 to 15 μm.

Within the above range of the average particle diameter ($D_{50}$), the average particle diameter ($D_{50}$) of the second positive electrode active material may be 5 to 80% of the average particle diameter ($D_{50}$) of the first positive electrode active material.

When the average particle diameter ($D_{50}$) of the second positive electrode active material is less than 5% of the average particle diameter ($D_{50}$) of the first positive electrode active material, many side reactions may occur due to a considerably large specific surface area, and dispersion may be difficult in a manufacturing process of the electrode. When greater than 80%, the difference in conductivity and electrode resistance between the upper and the lower layer portions of the electrode may be insignificant.

The specific surface area of the first positive electrode active material may be 0.1 to 0.8 $m^2/g$. When the specific surface area of the first positive electrode active material is less than 0.1 $m^2/g$, there may be a limitation such as the deterioration of cell output properties, and when greater than 0.8 $m^2/g$, there may be a limitation such as the deterioration of adhesion with the positive electrode current collector 10.

The specific surface area of the second positive electrode active material may be 0.5 to 1.5 $m^2/g$. When the specific surface area of the second positive electrode active material is less than 0.5 $m^2/g$, the improvement of stability may not be obtained, and when greater than 1.5 $m^2/g$, side reaction properties with an electrolyte is increased due to a considerably large specific surface area, which may cause the deterioration of cell performance.

The weight ratio of the first and the second positive electrode active materials included in the first and the second positive electrode mixture layers 21 and 22 may be 1:1 to 1:8.

By allowing the weight ratio of the first and the second positive electrode active materials to satisfy the above weight ratio range, the improvement of cell output properties and properties such as a long lifespan may be obtained.

Meanwhile, the total weight of the first and the second conductive materials included in the first and the second positive electrode mixture layers 21 and 22 may be 0.2 to 20 wt % based on the total weight of the first and the second positive electrode active materials.

The first and the second conductive materials are not particularly limited as long as they have conductivity without causing a chemical change in the electrode. For example, graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as titanium oxide; or a conductive polymer such as a polyphenylene derivative, and the like may be used.

The first and the second conductive materials may use the same conductive materials, or conductive materials of different materials. However, when processing ease and cost reduction are considered, it may be preferable to use the same conductive materials.

The weight ratio of the first and the second conductive materials included in the first and the second positive electrode mixture layers 21 and 22 may be 1:0.1 to 1:0, more preferably, 1:0.1 to 1:0.8.

As such, by allowing the amount of the first and the second conductive materials included in the first and the second positive electrode mixture layers 21 and 22 to be within the above range, the ratio of the specific surface area of the conductive material to the specific surface area of the positive electrode active material in the first and the second positive electrode mixture layers 21 and 22 may be controlled. However, a method for controlling the ratio of the specific surface area is not necessarily limited to varying the amount of a conductive material.

The average particle diameter ($D_{50}$) of the first and the second conductive materials may be 5 to 150 nm.

By using the first and the second conductive materials having the average particle diameter ($D_{50}$) within the above range, the ratio of the specific surface area of the conductive material to the specific surface area of the positive electrode active material in the first and the second positive electrode mixture layers 21 and 22 may be controlled. In this case, the first and the second conductive materials may use conductive materials of the same average particle diameter ($D_{50}$), or may use conductive materials of different average particle diameters ($D_{50}$).

In the positive electrode for a secondary battery 100 according to an embodiment of the present invention, the sheet resistance of electrode representing the electrical conductivity of the first positive electrode mixture layer 21 may be 0.010 to 1,000 Ωcm, and the sheet resistance of electrode representing the electrical conductivity of the second positive electrode mixture layer 22 may be 20 to 50,000 Ωcm.

By allowing the electrical conductivity of the first and the second positive electrode mixture layers 21 and 22 to satisfy the above range, when a metal body penetrates from the outside, the resistance between the positive electrode and the metal body may be significantly increased without deteriorating the output properties.

Meanwhile, the positive electrode current collector 10 is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector 10 may typically have a thickness of 3 μm to 500 μm, and microscopic irregularities may be formed on the surface of the positive electrode current collector 10 to improve the adhesion of a positive electrode active material. The positive electrode current collector 10 may be used in various forms of such as a film, a sheet, a foil, a net, a porous body, a foam, and a non-woven body.

The thickness ratio of the first positive electrode mixture layer 21 and the second positive electrode mixture layer 22 may be 1:1 to 1:8. Specifically, the thickness of the first positive electrode mixture layer 21 may be 15 to 100 μm, and the thickness of the second positive electrode mixture layer 22 may be 30 to 150 μm.

Meanwhile, the binder included in the first and the second positive electrode mixture layers 21 and 22 serves to improve the bonding among positive electrode active material particles and the adhesion between the positive electrode active material and the positive electrode current collector 10. Specific examples of the binder may include polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode 100 may be prepared according to a typical method for preparing a positive electrode. Specifically, the positive electrode may be prepared by applying a composition for forming a positive electrode mixture layer including a positive electrode active material, a conductive material, a binder, and a solvent on a positive electrode current collector, and then drying and rolling the same. In this case, the type and the amount of the positive electrode active material, the binder, and the conductive material are the same as those previously described.

The solvent may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive material, and the binder in consideration of an applying thickness of a slurry and manufacturing yield, and may allow to have a viscosity capable of exhibiting excellent thickness uniformity during the subsequent applying for the preparation of the positive electrode.

Also, as another method, the positive electrode 100 may be prepared by casting the composition for forming a positive electrode mixture layer on a separate support and then laminating a film separated from the support on the positive electrode current collector 10.

Furthermore, the present invention provides an electrochemical device including the positive electrode 100. The electrochemical device may specifically be a battery or a capacitor, more preferably, a lithium secondary battery.

The lithium secondary battery specifically includes a positive electrode, a negative electrode disposed to face the positive electrode, a separator disposed between the positive electrode and the negative electrode, and an electrolyte, and the positive electrode is as described above. Also, the lithium secondary battery may further selectively include a battery case accommodating an electrode assembly of the positive electrode, the negative electrode, and the separator, and a sealing member for sealing the battery case.

In the lithium secondary battery, the negative electrode includes a negative electrode current collector and a negative electrode mixture layer disposed on the negative electrode current collector.

The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, and an aluminum-cadmium alloy may be used. Also, the negative electrode collector may typically have a thickness of 3 μm to 500 μm, and as in the case of the positive electrode current collector 10, microscopic irregularities may be formed on the surface of the negative electrode current collector to improve the adhesion of a negative electrode active material. The negative electrode current collector may be used in various forms of such as a film, a sheet, a foil, a net, a porous body, a foam body, and a non-woven fabric body.

The negative electrode mixture layer includes a binder and a conductive material in addition to a negative electrode active material. The negative electrode mixture layer may be prepared by, for example, applying a composition for forming a negative electrode mixture layer, which selectively includes the binder and the conductive agent as well as the negative electrode active material, on the negative electrode current collector and drying the applied negative electrode current collector, or may be prepared by casting the composition for forming a negative electrode mixture layer on a separate support and then laminating a film separated from the support on the negative electrode current collector.

As the negative electrode active material, a compound capable of reversibly intercalating and deintercalating lithium may be used. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x$ ($0<x<2$), $SnO2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive material may be the same as those previously described in the description of the positive electrode.

In the lithium secondary battery, a separator separates the negative electrode and the positive electrode, and provides a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of high melting point glass fibers or polyethylene terephthalate fibers may be used. Furthermore, a coated separator including a ceramic component or a polymer material may be used to secure heat resistance or mechanical strength, and may be selectively used as a single layer or a multilayered structure.

Also, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of a lithium secondary battery, but is not limited thereto.

Specifically, the electrolyte may include an organic solvent and a lithium salt.

Any organic solvent may be used as the organic solvent without particular limitation as long as it may serve as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used as the organic solvent. Among these solvents, a carbonate-based solvent is preferable, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) is more preferable. In this case, when a cyclic carbonate and a chain carbonate are mixed in a volume ratio of about 1:1 to about 1:9, the performance of the electrolyte may be excellent.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. When the concentration of the lithium salt is included within the above range, the electrolyte has suitable conductivity and viscosity so that the electrolyte may show excellent performance, and lithium ions may effectively move.

In order to improve the lifespan properties of the battery, suppress the reduction in battery capacity, and improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may further be included in the electrolyte in addition to the above electrolyte components. In this case, the additive may be included in an amount of 0.1 wt % to 5 wt % based on the total weight of the electrolyte.

As described above, the lithium secondary battery including the positive electrode active material according to the present invention stably exhibits excellent discharge capacity, output properties, and capacity retention rate, thereby being useful for portable devices such as a mobile phone, a notebook computer, and a digital camera, and for electric cars such as a hybrid electric vehicle (HEV).

Thus, according to another embodiment of the present invention, a battery module including the lithium secondary battery as a unit cell, and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

$LiNi_{0.6}Mn_{0.2}Co_{0.2}O_2$ having an average particle diameter ($D_{50}$) of 13 μm as a first positive electrode active material, carbon black (average particle diameter ($D_{50}$): 60 nm) as a first conductive material, and PVdF as a binder were mixed in N-methylpyrrolidone, which is a solvent, in a weight ratio of 91:4:5 to prepare a composition for forming a first positive electrode mixture layer (surface specific area of positive electrode active material 0.2 $m^2$/g, specific surface area of conductive material/specific surface area of positive electrode active material=15).

Also, $LiNi_{0.6}Mn_{0.2}Co_{0.2}O_2$ having an average particle diameter ($D_{50}$) of 7 μm as a second positive electrode active material, carbon black (average particle diameter ($D_{50}$): 60 nm) as a second conductive material, and PVdF as a binder were mixed in N-methylpyrrolidone, which is a solvent, in a weight ratio of 93:3:4 to prepare a composition for forming a second positive electrode mixture layer (surface specific area of positive electrode active material 0.6 $m^2$/g, specific surface area of conductive material/specific surface area of positive electrode active material=9)

The composition for forming a first positive electrode mixture layer was applied on an aluminum current collector, and the composition for forming a second positive electrode mixture layer was applied thereon. Thereafter, the applied aluminum current collector was dried at 130° C. and then rolled to prepare a positive electrode. The thickness of the first positive electrode mixture layer was 30 μm, and the thickness of the second positive electrode mixture layer was 30 μm.

Example 2

A positive electrode was prepared in the same manner as in Example 1 except that a second positive electrode active material having an average particle diameter ($D_{50}$) of 6 μm was used to prepare a composition for forming a second positive electrode mixture layer (specific surface area of positive electrode active material 0.7 $m^2$/g, specific surface area of conductive material/specific surface area of positive electrode active material=8).

Example 3

A positive electrode was prepared in the same manner as in Example 1 except that a first positive electrode active material having an average particle diameter ($D_{50}$) of 13 μm, and carbon black (average particle diameter ($D_{50}$): 80 nm) as a first conductive material were used, and the first positive electrode active material and the first conductive material were mixed in a weight ratio of 91:3.5:4.5 to prepare a composition for forming a first positive electrode mixture layer (specific surface area of positive electrode active material 0.2 $m^2$/g, specific surface area of conductive material/specific surface area of positive electrode active material=12). In addition, a second positive electrode active material having an average particle diameter ($D_{50}$) of 7 μm and a second conductive material (average particle diameter ($D_{50}$): 60 nm) were mixed in a weight ratio of 93:2.5:4.5 to prepare a composition for forming a second positive electrode mixture layer (specific surface area of positive electrode active material 0.6 $m^2$/g, specific surface area of conductive material/specific surface area of positive electrode active material=8.5).

Comparative Example 1

A positive electrode was prepared in the same manner as in Example 1 except that a first positive electrode active material having an average particle diameter ($D_{50}$) of 13 μm, and carbon black (average particle diameter ($D_{50}$): 80 nm) as a first conductive material were used, and the first positive electrode active material and the first conductive material were mixed in a weight ratio of 91:3.5:4.5 to prepare a composition for forming a first positive electrode mixture layer (specific surface area of positive electrode active material 0.2 $m^2$/g, specific surface area of conductive material/specific surface area of positive electrode active material=12). In addition, a second positive electrode active material having an average particle diameter ($D_{50}$) of 7 μm and carbon black (average particle diameter ($D_{50}$): 50 nm) as a second conductive material were used, and the second positive electrode active material and the second conductive material were mixed in a weight ratio of 93:3:4 to prepare a composition for forming a second positive electrode mixture layer (specific surface area of positive electrode active material 0.6 $m^2$/g, specific surface area of conductive material/specific surface area of positive electrode active material=9.5).

Comparative Example 2

A positive electrode was prepared in the same manner as in Example 1 except that a first positive electrode active material having an average particle diameter ($D_{50}$) of 13 μm, and a first conductive material (average particle diameter ($D_{50}$): 60 nm) were mixed in a weight ratio of 93:2:5 to prepare a composition for forming a first positive electrode mixture layer (specific surface area of positive electrode active material 0.35 $m^2$/g, specific surface area of conductive material/specific surface area of positive electrode active material=10.5). In addition, a second positive electrode active material having an average particle diameter ($D_{50}$) of 8 μm, and a second conductive material (average particle diameter ($D_{50}$): 60 nm) were mixed in a weight ratio of 93:2:5 to prepare a composition for forming a second positive electrode mixture layer (specific surface area of positive electrode active material 0.5 $m^2$/g, specific surface area of conductive material/specific surface area of positive electrode active material=9.5).

[Preparation Example: Manufacturing of a Lithium Secondary Battery]

Lithium secondary batteries were respectively manufactured by using the positive electrodes prepared in Examples 1 to 3, and Comparative Examples 1 and 2.

First, natural graphite as a negative electrode active material, carbon black as a conductive material, and PVdF as a binder were mixed in N-methylpyrrolidone, which is a solvent, in a weight ratio of 85:10:5 to prepare a composition for forming a negative electrode, and the composition was applied on a copper current collector to prepare a negative electrode.

Each lithium secondary battery was manufactured by preparing an electrode assembly by disposing a porous polyethylene separator between the positive electrode prepared in Examples 1 to 3 and Comparative Examples 1 and 2 and the negative electrode prepared as above, disposing the electrode assembly in a case, and then injecting an electrolyte into the case. In this case, the electrolyte was prepared by dissolving lithium hexafluorophosphate (LiPF$_6$) of 1.0 M concentration in an organic solvent of ethylene carbonate/dimethyl carbonate/ethylmethyl carbonate (mixing volume ratio of EC/DMC/EMC=3/4/3).

[Experimental Example] Evaluation of Electrical Conductivity and Stability

The sheet resistance of each electrode was measured for the positive electrodes prepared in Examples 1 to 3 and Comparative Examples 1 and 2 by using a 4-point probe to measure the electrical conductivity of each electrode.

In addition, the lithium secondary batteries respectively manufactured by using the positive electrodes prepared in Examples 1 to 3 and Comparative Examples 1 and 2 were subjected to a test under the same conditions as those for the Chinese GB/T certification to measure the penetration resistance thereof through a change in resistance, the test in which a metal body having a diameter of 5 to 8 mm was dropped at a rate of 25±5 mm/sec to penetrate a cell. In addition, whether there was an explosion or not was evaluated.

The results are shown in Table 1 below.

TABLE 1

| | Electrical conductivity (Ωcm) (sheet resistance) | Penetration resistance (Ω) | Explosion or no explosion |
|---|---|---|---|
| Example 1 | 2,500 | 4.0 | No explosion |
| Example 2 | 3,000 | 5.1 | No explosion |
| Example 3 | 2,500 | 4.5 | No explosion |
| Comparative Example 1 | 1,500 | 3.0 | Explosion |
| Comparative Example 2 | 2,000 | 3.5 | Explosion |

As can be seen in Table 1, Examples 1 to 3 which satisfy the ratio of the specific surface area of a conductive material to the specific surface area of a positive electrode active material, the ratio according to the present invention, showed somewhat excellent electrical conductivity compared with Comparative Examples 1 and 2 which do not satisfy the ratio, and showed greatly increased penetration resistance. As a result, it was possible to prevent the explosion of the battery due to overcurrent by suppressing the overcurrent.

The invention claimed is:

1. A positive electrode for a secondary battery, comprising:
    a positive electrode current collector;
    a first positive electrode layer laminated on the positive electrode current collector, the first positive electrode layer including a first positive electrode active material and a first conductive material; and
    a second positive electrode layer laminated on the first positive electrode layer, the second electrode layer including a second positive electrode active material and a second conductive material, wherein
    the average particle diameter (D$_{50}$) of the second positive electrode active material is 5 to 80% of the average particle diameter (D$_{50}$) of the first positive electrode active material,
    the ratio of the specific surface area of the second conductive material to the specific surface area of the second positive electrode active material is 9 or less, and
    the ratio of the specific surface area of the first conductive material to the specific surface area of the first positive electrode active material is 11 or greater.

2. The positive electrode for a secondary battery of claim 1, wherein the average particle diameter (D$_{50}$) of the first positive electrode active material is 10 to 100 μm.

3. The positive electrode for a secondary battery of claim 1, wherein the average particle diameter (D$_{50}$) of the second positive electrode active material is 1 to 15 μm.

4. The positive electrode for a secondary battery of claim 1, wherein the specific surface area of the first positive electrode active material is 0.1 to 0.8 m$^2$/g.

5. The positive electrode for a secondary battery of claim 1, wherein the specific surface area of the second positive electrode active material is 0.5 to 1.5 m$^2$/g.

6. The positive electrode for a secondary battery of claim 1, wherein the weight ratio of the first positive electrode active material to the second positive electrode active material both included in the first and the second positive electrode layers is 1:1 to 1:8.

7. The positive electrode for a secondary battery of claim 1, wherein the total weight of the first and the second conductive materials is 0.2 to 20 wt % based on the total weight of the first and the second positive electrode active materials.

8. The positive electrode for a secondary battery of claim 1, wherein the weight ratio of the first conductive material to the second conductive material both included in the first and the second positive electrode mixture layers is 1:0.1 to 1:1.

9. The positive electrode for a secondary battery of claim 1, wherein the average particle diameter (D$_{50}$) of the first and the second conductive materials is 5 to 150 nm.

10. The positive electrode for a secondary battery of claim 1, wherein the sheet resistance of the first positive electrode mixture layer is 0.010 to 1,000 Ωcm, and the sheet resistance of the second positive electrode mixture layer is 20 to 50,000 Ωcm.

11. The positive electrode for a secondary battery of claim 1, wherein at least one of the first positive electrode active material and the second positive electrode active material comprises a lithium transition metal oxide represented by Formula 1 below:

$$Li_aNi_{1-x-y}Co_xMn_yM_zO_2 \quad \text{[Formula 1]}$$

(in the above formula, M is any one or more elements selected from the group consisting of Al, Zr, Ti, Mg, Ta, Nb, Mo and Cr, and 0.9≤a≤1.5, 0≤x≤0.5, 0≤y≤0.5, 0≤z≤0.1, and 0≤x+y≤0.7).

12. The positive electrode for a secondary battery of claim 1, wherein the first conductive material and the second conductive material comprise at least one or more selected from the group consisting of natural graphite, artificial graphite, carbon black, acetylene black, Ketjen black, channel black, furnace black, lamp black, thermal black, carbon fiber, copper, nickel, aluminum, silver, zinc oxide, potassium titanate, titanium oxide, a polyphenylene derivative, and a combination thereof.

13. The positive electrode for a secondary battery of claim 1, wherein the thickness ratio of the first positive electrode layer to the second positive electrode layer is 1:1 to 1:8.

14. A lithium second battery comprising:
    an electrode assembly including a positive electrode, a negative electrode, and a separator interposed between the positive electrode and the negative electrode;
    a battery case for housing the electrode assembly; and a non-aqueous electrolyte injected into the battery case, wherein the positive electrode is a positive electrode according to claim 1.

* * * * *